(12) United States Patent
Friedlander (10) Patent No.: US 8,810,400 B2
(45) Date of Patent: Aug. 19, 2014

(54) COPPER TRACKING METHOD BY USING VISUAL AND MACHINE READABLE MARKINGS

(76) Inventor: Gregory M Friedlander, Mobile, AL (US)

( * ) Notice: Subject to any disclaimer, the term of this patent is extended or adjusted under 35 U.S.C. 154(b) by 231 days.

(21) Appl. No.: 13/250,435

(22) Filed: Sep. 30, 2011

(65) Prior Publication Data

US 2012/0081228 A1    Apr. 5, 2012

Related U.S. Application Data

(60) Provisional application No. 61/389,441, filed on Oct. 4, 2010.

(51) Int. Cl.
| | |
|---|---|
| *G08B 21/00* | (2006.01) |
| *G09F 3/00* | (2006.01) |
| *G06Q 50/02* | (2012.01) |
| *G06Q 10/08* | (2012.01) |

(52) U.S. Cl.
CPC .............. *G06Q 50/02* (2013.01); *G09F 3/0292* (2013.01); *G06Q 10/08* (2013.01)
USPC ............ 340/572.1; 340/540; 283/81; 283/89; 283/95; 283/101

(58) Field of Classification Search
USPC .......... 340/572.1, 539.1, 540; 283/70, 81, 89, 283/95, 100, 101
See application file for complete search history.

(56) References Cited

U.S. PATENT DOCUMENTS

| | | | | |
|---|---|---|---|---|
| 4,710,745 A | * | 12/1987 | del Rosario | 340/428 |
| 6,076,859 A | * | 6/2000 | Hall et al. | 283/89 |
| 2006/0232424 A1 | * | 10/2006 | Duschek | 340/572.8 |

* cited by examiner

Primary Examiner — Jeffery Hofsass (57) ABSTRACT

Tapes for marking valuable components and their housings and supporting posts are described along with a process for utilizing the tapes including the steps of sequentially marking the copper and the equipment with a MR marking (e.g. bar-codes, Q-R codes and/or EF transmitters). EF or related broadcasting transmitters or their equivalent would be thin enough and responsive to a signal; machine reading a MR sequence on copper that is brought; marking the copper sold before, after or at the point of sale; identifying the location and coding the copper as stolen at the point of theft, utilizing a nationwide system of copper marking tied to the buyer's information; visually marking the copper in a non-sequential way, potentially by region or state in order to minimize the amount of overlap and would also include the concepts of mandatory scanning of copper products at installation or recycling.

19 Claims, 10 Drawing Sheets

COPPER TRACKING METHOD BY USING VISUAL AND MACHINE READABLE MARKINGS

PRIORITY

This patent claims priority based on U.S. Provisional Patent filed Oct. 4, 2010 61/389,441.

BACKGROUND OF INVENTION

1. Field of Invention

The invention relates to a method for marking and tracking in order to limit theft and in order to catch people who steal particularly copper and precious metals and equipment incorporating these metals and in particular in the after market.

2. Prior Art

Marking of valuables and metals dates back before 1950. RF Transmitters are well known in the art as well as machine readable (MR) markings (e.g. bar codes). Sales registration techniques are also well established for various purposes of locating items and tracking them from a point of sale. Tamper evident tapes are also known in prior art.

GENERAL DISCUSSION OF THE INVENTION

Tapes for marking valuable components and their housings and supporting posts are described along with a process for utilizing the tapes. The process involves the steps of sequentially marking the copper and the equipment or housings in which it is located with a MR marking (e.g. barcodes, Q-R codes and/or EF transmitters). EF or related broadcasting transmitters or their equivalent would be thin enough and responsive to a signal so that it would not require direct power; machine reading a MR sequence on copper that is brought; marking the copper sold before, after or at the point of sale; identifying the location and coding the copper as stolen at the point of theft, utilizing a nationwide system of copper marking tied to the buyer's information, either name, address, e-mail, telephone number or a combination therewith; loading software with the information either as it is sold or as it is stolen; visually marking the copper in a non-sequential way, potentially by region or state in order to minimize the amount of overlap and would also include the concepts of mandatory scanning of copper products at installation or recycling.

The invention comprises a method of marking valuable items and in particular copper products utilizing, machine readable markings or codes (bar, Q-R, EF transmitters, and the like) human codes (numeric, color, symbols) along the length of the product, marking the housing where appropriate and at the point of sale and installation associating the markings with a particular owner, type of owner, location and type of location.

Exterior and interior markings are included which included both machine readable (MR) markings and visual markings which show that an MR markings are available for the copper which is etched into the copper itself or otherwise determinable by human readable markings.

Copper theft has become a billion dollar problem, with the amount of copper being stolen disproportionately small compared to the amount of damage done, and the problem has become significant enough that it now appears necessary that a nationwide effort be made to protect at least some of the copper. The technology exists in order to make it cost effective to provide at least limited tracking capacity.

The purpose is to discourage theft since it would be impossible to stop theft.

The process involves the steps of sequentially marking the copper and the equipment or housings in which it is located with a MR marking (e.g. barcodes, Q-R codes and/or EF transmitters). EF transmitters or their equivalent would be thin enough and responsive to a signal so that it would not require direct power; electronically reading a MR sequence on copper that is brought; marking the copper sold before, after or at the point of sale; identifying the location and coding the copper as stolen at the point of theft, utilizing a nationwide system of copper marking tied to the buyer's information, either name, address, e-mail, telephone number or a combination therewith; loading software with the information either as it is sold or as it is stolen; marking the copper potentially by region or state in order to minimize the amount of overlap and would also include the concepts of mandatory scanning of copper products at installation or recycling.

Tracking would include level 1 marking the copper, level 2 checking at various locations where copper is installed at level 3 checking at the point where it is inspected or recycled in the after market.

In order to provide that recyclers would not need their own tracking equipment it would be possible to get a bill of availability at a police station utilizing their equipment to test or to have it at the buyer's location and could also include drive-by or constant on location monitoring since transmitters could transmit far enough to allow information to be read by wireless alarm systems.

Reporting could occur where the equipment is either marked as stolen or whether it is sufficiently far from the purchase or marking site to raise issues that require a further investigation which would allow the product to be tracked to the buyer where the buyer participated in order to determine whether or not a theft had occurred.

Where equipment or metal marked is within a housing, MR coding on the housing is preferably the same as interior bar coding or is associated the interior bar coding in a way to align the two (important where the parts are manufactured separately or where repair parts are installed.

It would be important that the product be marked with buyer and seller information, the location and whether it was voluntarily being removed or stolen. Also it is important that the participation of the various installers would be helpful in this regard and software for tracking the data at every stage including replacement of parts would be helpful with confirming by a central authority so that tracking would require that removed parts be validated on a regular basis.

It is therefore an object of the invention to allow tracking of data regarding the location of devices and to associate these with existing alarm systems.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals.

DETAILED DESCRIPTION OF THE PREFERRED EXEMPLARY EMBODIMENTS

Figure 1:
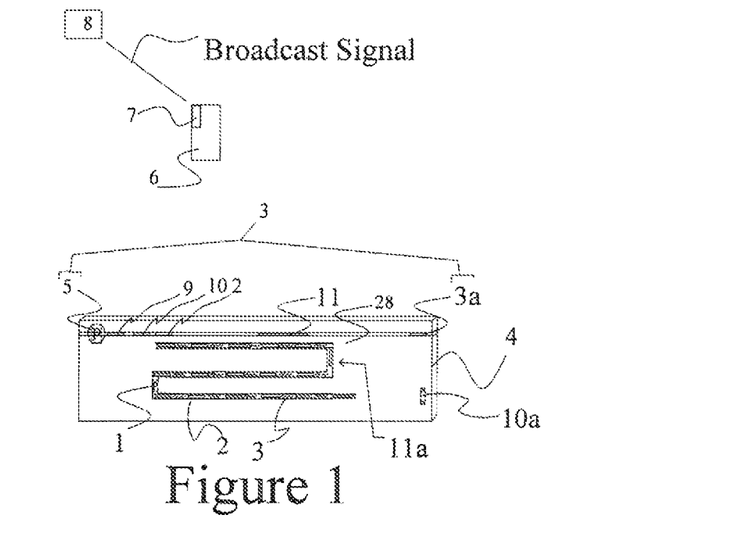
FIG. 1 shows how interior and exterior marking may be used to show where a product has been marked.

As can best be seen by reference to FIG. 1, the invention includes at least one valued item or component (1) which is usually a copper member such as a wire, pipe or condenser (although it may be a bicycle handle bar, frame or the like) having a length on which a marking system (28) may be put in place which may be incorporated into a housing (4) a (such as copper tubing (member 1) in an air conditioner unit housing (4) which is preferably marked with a designator (5) to show that the housing (4) component (1) has the marking system (28). A tape (22) may be used with a machine readable marker (2) which would be from the group comprising a RF transmitter, a bar code or Q-R code, a visual marker of color or numeric type or other electromagnetic or visual device or some combination of those. A MR code reader (6) which may be incorporated in a cell phone for convenience to read the MR code is also present. In FIG. 1 carried on tape (22) you have as visual marker 3 a written warning 9 (e.g. "This product is marked against theft including all copper within it"), a sequential MR code marker (2) so it may be read with the reader 6 (scanner), A RF transmitter (10) is also shown. The continual markings 11 on item 4 and 11 a shown on item 1 represents a repeating display of the visual marker (3) warning 9, MR marker (2) and, where present, a specific type of MR marker, transmitter (10). How often these are repeated is up to the user.

This same arrangement marking may be put in place along the length of the components 1 (copper, aluminums, etc) and preferably outside on the housing (4).

A RF transmitter (MR marker 10a) preferably hidden on the housing (4).

The transmitter MR marker 10a may be attached separately from the other markings as shown on the housing 4 as well as on the tape at locations on the housing and on tape 22.

Figure 21:
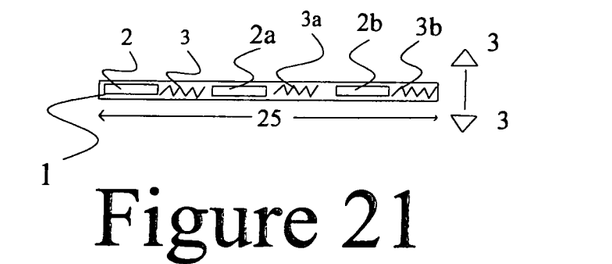
FIG. 21 shows a detail of the interior markings shown in FIG. 1.
Figure 22:
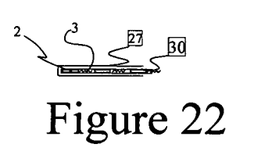
FIG. 22 shows how marking would appear on a marked pipe.

The close up shown in FIG. 21 shows that the marking system (28) may be comprised of a MR marker, (2) here RF transmitter 10 and a human readable or recognizable visual marker 3 a second MR marker (22), a second visual marker (3a) and continuing along the length or at least a portion of the length of the component (1) and/or housing (4).

The marking tapes (22) are sequential; allowing a particular marked item or series of marked items or length of marked item to be associated with an owner or location. Length is the length between two or more sequential markers.

While a single marker may be desirable in many situations the purpose of having two is so that if a surface MR marker (2) is removed, other MR markers (2, 2a, 2b) remain in place. There may be coded sequential. MR markers 2 and secondary MR Markers 2a or visual markers 3 which need not be sequential or machine readable. Part of the system herein disclosed is in order to have a marker or a portion that can be removed leaving the device more permanently marked so that the purchaser of the copper knows that the copper has been altered in an unacceptable fashion to remove the MR marker which allows for the copper to be reported and potentially tracked by use of the markers.

The exterior marker (designator 5), preferably extends around the housing (4) of equipment (55), on a (tape 22), having MR markers (2) and visual markers (3) corresponding in type to the group for the marking system (28) which allows a stolen piece of equipment to be visually identified if it shows up at a new location.

Using a reader (6) and the transmitter (7) which may be (a code scanner in a cell phone application, for example) with QR or barcodes the marker information is sent to a computer database (8) where information of each stage is included to the extent possible including where the product is made manufacturer, where it is sold, installed or moved to Retailer, Buyer, installer, demolisher/recycler, including information on the unit such as warranty information all of which can be originally obtained and then cross-checked at the point of sale as well as by the end consumer. Components, if marked separately, may be marked as replacements and associated with the housing marking; e.g. tape (22).

Important in this is an indication by the consumer of whether it is demolished or sold or whether it is missing which would imply it is stolen as well as information as to whether it is recovered and what marked parts have been added or replaced. Address information for where it is demolished or where it goes missing would also be important to see if a unit is where it belongs and this may be a chain of addresses.

Figure 19:
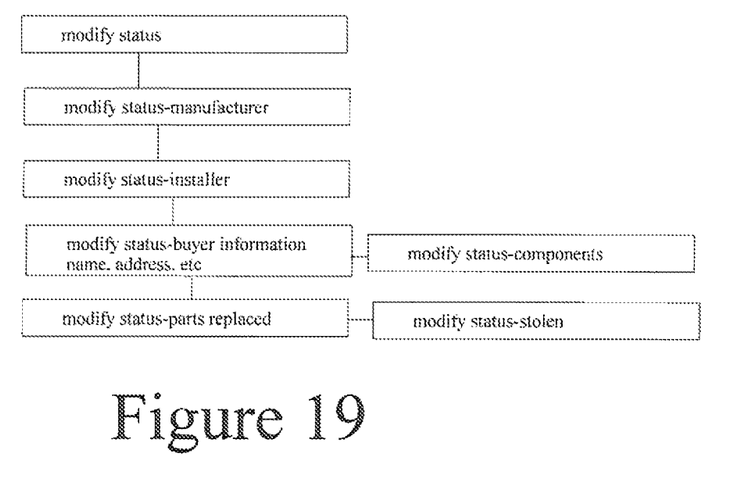
FIG. 19 shows the process steps for maintaining ownership records of a copper product owner.
Figure 20:
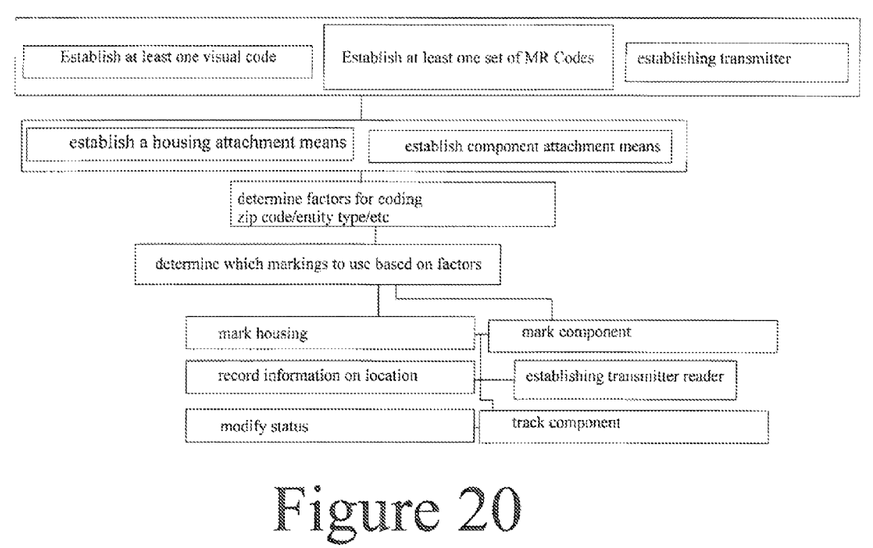
FIG. 20 shows the process steps for tracking copper.

FIGS. 19 and 20 show a diagram of how the information is tracked showing the manufacturer sending information to the database (8) before it is sold to the retailer and then to the buyer and then to either the person to whom it is sold or to mark location and status. This allows the user to monitor where when the product is brought to a recycler whether the product is stolen or not by the simple expedient of either having the device scanned at a central location using a scanner at the recyclers' or by entering the information by hand into either a computer database or a telephone driven database allowing the keypad of the telephone to identify the component and housing so that it can be determined whether the particular component in question has been marked as stolen or not according to the database.

Figure 2:
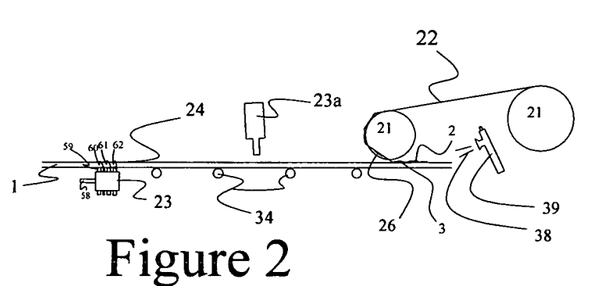
FIG. 2 shows how markings may be applied in a factory setting.

The method of attaching the markers may be any of the methods known in the art for marking devices and copper and FIG. 2 shows a mechanism which includes having the copper member (component 1) move through a moving means, here over rollers (34) while an etching means, such as a mechanical buffer 23 or laser cutter (23a) applies a visual marker 3 and/or a dispenser (21) dispenses over the copper member (component 1) a marker from the group comprising (coating, insulation, stain, corrosive, dye or tape 22 from a dispenser (21) This marks the member 1 using either etching on the surface (24).

Figure 3:
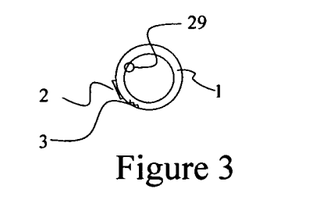
FIG. 3 shows how insulators, nano-technology, stamping or isotopes may be used to mark a product on the interior or exterior so that a visible marker and a MR marker may be used in conjunction with embedded marking.

A marking may be applied to or in the interior as shown with internal marker (29) in FIG. 3 or in the case of the applicator, dispenser (21) by rolling off a substance dispensed and may include tape (22) containing one or more of the markers (2, 2a, 2b, etc. or 3, 3a, 3b) onto the surface (24) of the copper member (component 1) to which it is adhered by a tape 22 or glue (26).

FIG. 3 is a cross section through the 3-3 access of FIG. 2 and shows how an internal marker (29) which may be a visual or MR (including chemical tracings) marker may be used inside a marked item (component 1) in order to allow the copper to be traced even if all of its surface markers (e.g. MR marker 2 and visual marker 3) are removed.

In some cases the coding on items 2, 2a, 2b etc. would be the same. This would be the case if all the markings were being used in a single piece of equipment such as the copper in an individual air condition.

In other cases they would be sequential so that each one would be different from the proceeding one so that knowing that the first one is and the third one can determine the second for example. This will be useful for wire so that if you strung wire in a house you could hit the first length of wire code and the last length of wire code installed in the house so that you would know all the codes in between that were used in the home.

Figure 4:
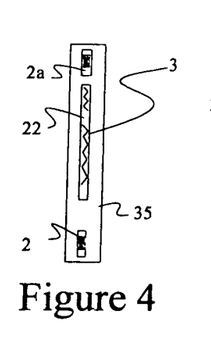
FIG. 4 shows one type of tape used to apply marking technology.
Figure 5:
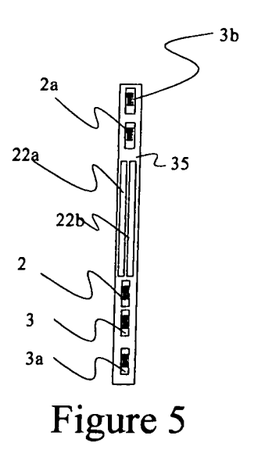
FIG. 5 shows an alternative embodiment to the embodiment shown in FIG. 4.
Figure 6:
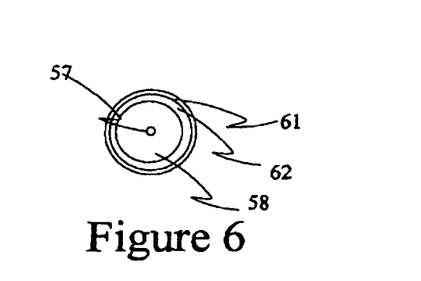
FIG. 6 shows a cross section of FIG. 17.

As shown in reference to FIGS. 4-24 the tape (22) may have a coating, which etches (chemically or otherwise) the visual marker (3) (bar code, numeric code, pattern, line, color etc) into the copper to which it is applied. The tape (22) is preferably on a carrier (35). FIG. 4 shows visual markers 3, 3a and the tape (22). FIG. 5 shows tape with visual markers (22a) and with MR markers (22b) as well as individual visual markers 3 and individual MR markers (2 and 22) While the visual marker and MR marker (3 and 2) may be the same for a given component they are preferably sequential.

A reader (6) having a transmitter (7) as shown in FIG. 1 determines at the point of manufacturing or at the point of sale the numbers or other identifying features of the markers (2, 3, 2a, 3a, 2b, 3b, etc) that are associated with a given component (1) or a given housing (4) for incorporating the component for tracking purposes. Tamper indication tapes are present in the prior art and are envisioned in these patents to carry the visual and MR markers so evidence after removal is present. One step in the process is to refuse payment for recycling without the MR markings.

Figure 23:
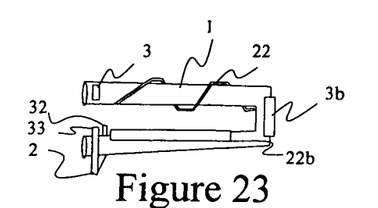
FIG. 23 shows a pipe with marking tape applied.
Figure 24:
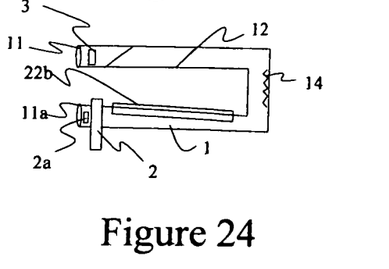
FIG. 24 shows an alternate embodiment of the pipe shown in FIG. 23.

FIG. 23 and FIG. 24 show the application of tapes from FIG. 4 and FIG. 5. It is important to note that all the portions of the tape 22, 3 and 3a are shown on a single piece of tape in FIG. 4 it is altogether likely they would be different carriers of each part as it is stuck on.

FIG. 23 shows how tapes may be wound around a item to be marked here copper member one and how the various items may be included and in particular the tapes spiraled around the copper member it is removed it leaves behind a residual mark 12 which may be burned in or may be residual left by the tape which is something that is indicative of the visual marker and other forms of that are shown where item 22 was removed which would be an indication that a machine readable marker was removed. Other locations where markers were shown show the different ways they may be applied and left in place on the copper member This residue, residual mark 12, on the housing 4 would show where the visual marker 3 on the housing 4 was removed which would indicate a theft encouraging additional investigation.

A third dispenser 51 is shown dispensing at least one fixing means 50, which may be from the group comprising the second part of an epoxy, a neutralizing agent to stop etching, a coating dispenser, or the like or a combination of those to protect the marking, the marked item, or both.

Figure 7:
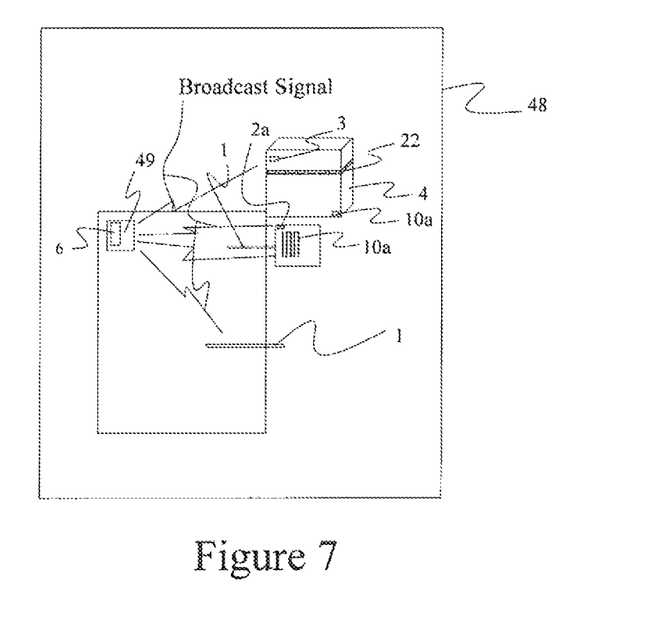
FIG. 7 also shows how an existing alarm monitoring system can be used in conjunction with the invention.

FIG. 7 shows a zone of protection (perimeter 48) where the air conditioner can sit and based on the use of MR markers that broadcast (RF signals) MR Markers (10a) and (2a) communicate with an alarm system (49) so that if the entire unit or the MR markers are removed from that location, the alarm system recognizes the removal and utilizing existing software communicates the theft. This can be applied to wiring or other pipes within the residence as long as they are marked with transmitters. Where a circuit is created by joining ends (e.g. end one 32 and end two 33) of a transmitter, the breaking of that seal can trigger the alarm and the copper may be physically attached through such a transmitter to the housing so that if it is removed from the housing the signal is given and likewise the entire housing 4 (e.g. an air conditioning unit) can be attached to the house or otherwise so that ends one (32) and two (33) must be separated in order to remove it.

The invention will move through a series of stages including manufacturing, assembling, wholesale sale, retail sale, installation, demolition and recycling. A database is used to track the MR marking through these stages.

It can be seen that the mechanisms described herein could be applied to existing devices such as an in-place air conditioning unit without departing from the inventive scope herein or used in initial manufacturing with proper notification.

Data associated with the device at each stage would include: (1) manufacturers' identification serial number (2) assemblers' identification (3) the equipment to which it is assembled including a serial number attached to that equipment (housing 4) the wholesale buyers' information (5) the retail buyers' information (6) the type of metal and (7) the type of markings and what components should be found on it. In addition, the installation information and the information that it is stolen or not stolen are important for purposes of tracking the copper. Finally the stage through which it has passed (sale, theft, installation, etc.)

In addition one or more MR marking may be camouflaged as a part of the air conditioner. While this does not protect the copper in all cases it does prevent the unit from being used without the risk of detection.

Since RF transmitters are fairly easily removed, the purpose for having a visual marker is that if the MR marker is removed it creates evidence of wrongdoing especially if that has been removed along a substantial length of the material.

While the discussion herein centers on copper, any valuable device could be similarly marked. One of the purposes of having a transmitter as opposed to just a visual reader which would include a numeric or bar code type marking would be to allow for patrolling officers to be able to determine the location of copper pieces both for determining whether they were still in place and this would also include non-policeman or whether they had gone missing and even potentially to locate where they were at as well as to allow the monitoring of copper recyclers.

A symbolic process describing the invention herein would include the steps of establishing an alphanumeric system machine readable marking allowing for sequential marking of lengths of copper.

Marking copper and/or a container and/or support; installation establishing a visual marker of the copper.

In order to make a better machine readable product, one version includes a broadcast strip or sensor providing an RF (radio frequency) signal, which is on an alpha-numeric system, which allows it to correspond to the previously described alphanumeric symbolic system for other machine readable codes such as bar coding and the equivalents.

Tying together the RF system with at least one of the alphanumeric systems numbers attached to at least one marked item, which are preferably along a component 1 and preferably at the beginning and end of the length 25 of component 1. Storing the information on a computer database.

Adding additional information as it is developed from the list comprised of the manufacturer, the assembler, the buyer, any subsequent buyers, the installer, the location where it is installed and the status of the product as either still in use, resold or missing and any parts added or removed and whether added parts have markings.

Checking copper which is stored or in preparation for recycling in order to see whether it corresponds to the copper in question in order to determine whether it is stolen or not stolen at the point of recycling and marking copper products with a symbol designating that it is a part of the tracking system and publicizing that this information is available.

FIGS. 8-11 and FIGS. 13-16 show some details of a visual and MR marking process, which are helpful in understanding how the tape is used to mark copper. There is great deal of leeway in the specific method that is practiced so that the techniques taught are exemplary.

One element is to provide a mechanism for transferring chemically a barcode from a sheet or carrier (35) to the marked item, especially copper in a way that does not damage the copper for its intended use.

Figure 8:
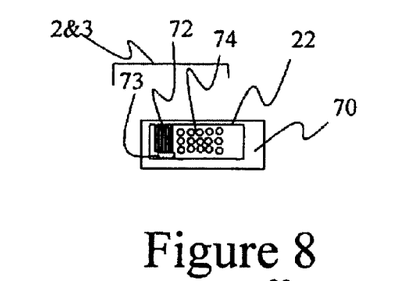
FIG. 8-11 shows a method using MR marking.

As shown in FIG. 8 there is one or more markings on a carrier (20) which peals off of a tape (22) which may have visual print means 71) which may include QR marking (74) or bar-code marking (72) a numeric designation (73) and which may be a different kind of reading or may be a human readable warning of which allows the user to know that the copper is marked and perhaps a warning about the removal of the markings being a crime where appropriate.

Figure 9:
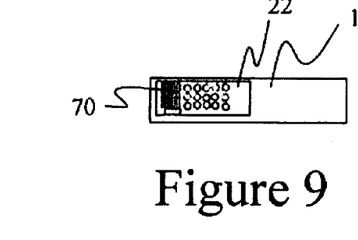

In FIG. 9, it shows where the carrier (70) has been moved from the tape (22) and put on a piece to be marked, here component (1).

Figure 10:
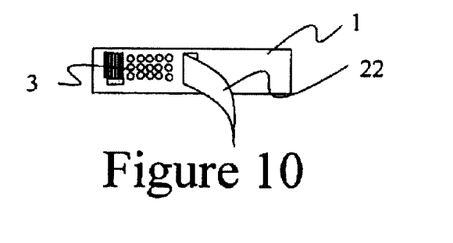
Figure 11:
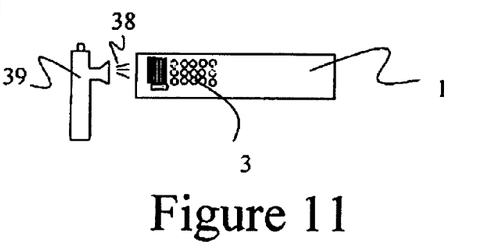

The tape may be left in place or as shown in FIG. 10 it shows the tape (22) being peeled away from the copper member (component 1) leaving the print means (71) which was, as was indicated before, a dye or chemical imprint on the carrier (70) transferable to the component (1).

Thereafter (FIG. 11) a fixing spray (38) from a dispenser (39) may be applied to neutralize either acids or other corrosive elements in the print means (71) or in order to fix item (print means 71) or the markers transferred to the component 1 in place.

In some cases it may be adequate to have the product self-fixing through chemicals which are automatically fixed e.g. glues which dry, tamper proof tape and the likes. Automatically fixed could include chemicals that burn to only an acceptable extent.

The key is that whatever the mechanism is, it is designed to permanently attach or stain the copper or other component without damaging it for its intended use.

FIG. 13-16, shows where a similar technique is used. In this case, instead of having chemicals on top of a carrier (70), the carrier (70) is a template and the markings (shown as print means 71) are cut out on it. The coding may be secured through the markings (71) using a chemical marking spray (40) which may be paint or dye from second dispenser (41).

Figure 14:
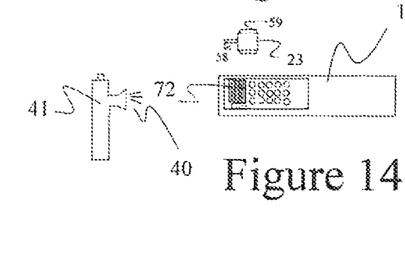
Figure 15:
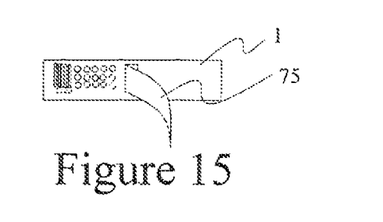
Figure 16:
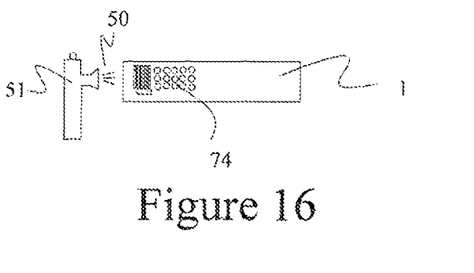

In this case, after being applied to the copper (component 1) shown on FIG. 14 a marking spray (40) from a second dispenser (41) is used in order to put the chemical in place and after allowing it to dry if necessary, the covering tape (22) may be peeled off of the copper (component 1) so that the bar coding remains and then a second fixing spray (38) from a dispenser (39) may be applied. In place with using a spray or pain on process, a buffer 23 of one type as described above may be used.

Patterns are the preferred embodiment allowing for the tapes to be scanned before application and a second scanning of the product on the copper itself afterwards. It can be seen that using dot matrix type printing or other printing type scanners, that the tapes could be eliminated and the markings could be applied directly to the copper, the tapes may be printed on site on various color coding or patterns which are visual and can identify what color or color combinations may maybe thereby designated.

To differentiate the location using visual markers for zip codes or different types of user (government, etc.) odd/even stripes may be used, color coding (e.g. blue for government, red for business, green for rental, orange for a relocated or resold unit, etc.).

Figure 12:
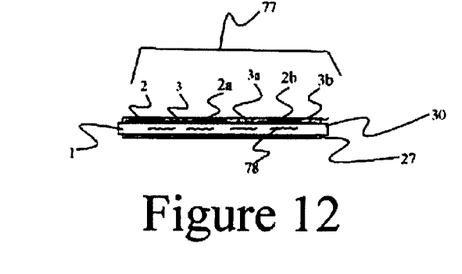
FIG. 12 shows how the application of visual and MR markings can be used with insulation.
Figure 13:
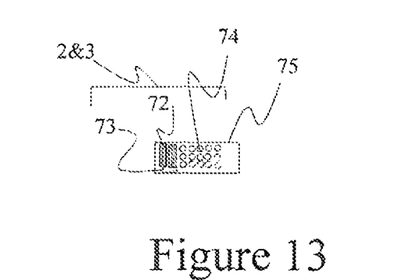
FIG. 13-16 shows an alternate method to FIGS. 8-11 to embed the image on the copper or the exterior of the device to be marked.

Referring to FIG. 12, the marking (items 2 or 3) may be incorporated in a sheath (27) over a wire (30) so that the insulation covering a device or the holder covering the device may have the marker instead of the actual component (1) (here wire). A portion of the MR Marker 2 here is shown as a sheath marker (77) and a portion as interior marker (78) to show that it may be visible, hidden or both. In the preferred embodiment, it is better to have the copper and sheath marked. The copper or other component 1 can be marked in this manner with a non-sequential marking as with visual marker 3 and the sheath with a sequential marking as with machine readable marker 2.

Figure 17:
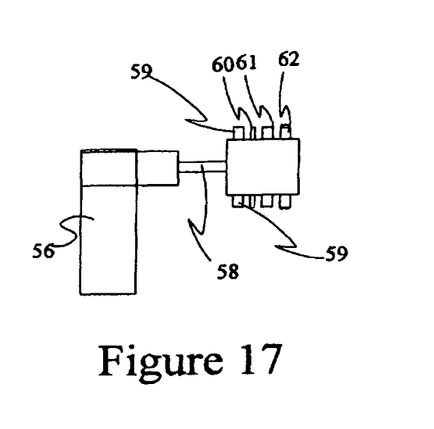
FIG. 17 shows a buffer for after market use.

FIG. 17 shows a drill 56 having a drill bit holder defining an axis 57, which turns a spindle (58) which has a plurality of brushes or a single brush of multiple heads which can be defined as a first brush 59, second brush 60, third brush 61, and fourth brush 62 which may have different textures, widths, lengths or otherwise so as to serve to form a pattern which can be buffed into a housing or a component (as with a copper member with SCOTCH BRIGHT) by holding it against the component or any other valuable that needs to be marked so that there is a visual marker to go along with the machine readable marker described in the preferred embodiment.

Figure 18:
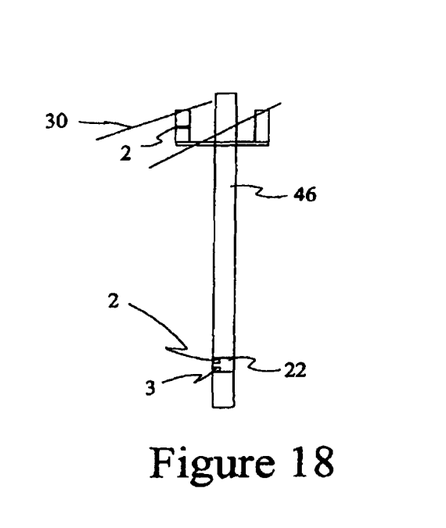
FIG. 18 shows the method used to protect remote casings and marked items.

As show in FIG. 18 post 46 or other housing supports may also be marked so ground level with a support marker (47) for observation of marking status and may tie in with interior markings (item 11a in FIG. 1) inside a housing (4). This should allow a determination of a properly documented copper marked item length to be tracked. Since the chances of most copper pieces being tracked are relatively small, one important purpose is as a deterrent. A thief seeing that a marked item has been marked either pre or post production with this technology should be hesitant to steal the item. Part of the reason for having this properly documented would be to encourage enforcement and hence the policemen could be provided with access to the database in order to report a theft so that it could be matched with potential database choices even if a mark of product was not present in order to allow for enhanced reporting of copper theft.

Referring to the specific embodiments with flow chart diagram (FIGS. 19 and 20) the tape 22 shown on a strip having a first MR marking 2a, at least one strip (tape 22) which may have a non machine readable, non-sequential marking and a second MR marketing 2. The section with machine readable markings in one example shows where there are multiple MR marking in case something happens to one or in case they both need to be placed at different locations, such as one on the exterior and one on the interior or one on one end and one on a second end of a given length. There is preferably one at the beginning and one at the end of the copper component (component 1) but it could be that only one would be necessary since the copper is otherwise marked with a visual marker 3.

It may be described as a method of marking components which are installed at a location comprising the steps of 1) preparing at least one tape with markings from the group comprising visual and machine readable markings; 2) applying the at least one tape to the components, 3) fixing the markings to the component so that removal of the markings is indicated and may include the steps of including at least one machine readable marking on the tape and reading the machine readable marking with a machine, loading the marking information onto a computer database and associating the code with location information related to component and my include the step of defining a plurality of different machine readable markings for marking of a plurality of components and including at least one visual marking for marking the component as having a machine readable marking.

With many items such as air conditioners, the component fits within a housing and further comprising the step of marking the housing to show the component is marked according to the method. Where the housing comprises a post 46 supporting the housing 4, said post having a portion at eye level and wherein the marking is on the post at eye level.

The marking system preferably comprises a chemical marker not commonly found on the component showing that the component has been associated with a machine readable marking. The machine readable marking may be one issuing a RF transmission and a MR reader for reading the transmission and a perimeter within which the RF transmission is readable by the MR reader so that if the machine readable marking is moved outside of the perimeter the movement is sensed and comprising the step of issuing an alarm when the marker is moved outside of the perimeter.

In all cases, the component has a length and wherein the markings are comprised of a sequential series of markings along the length. The tape comprises a chemical for altering the component to include the marking into the component. Where the component is copper it may be that the chemical is an acid defining the marking or where the marking comprises a template defining openings for receiving chemical. Alternatively the marking comprises a template defining openings and further comprising the step of buffing the markings through the openings in the tape. The tape is preferably a tamper evident tape of the type that exists in the prior art printed with the appropriate markings. Also, the at least one tape comprises a plurality of tapes each having at least one marking as described herein.

A broader definition of the method of marking components is marking with a length installable at an address comprising the steps of establishing a set of sequential machine readable (MR) markings along the length, installing a portion of the component at a given location so that a least a first machine readable marking is at the beginning of the installed component and at least a second machine readable marking is at the end of the installed component; recording in a database the first and second MR marking; associating the first and second MR marking and any interim MR markings in the sequential series with the address and comprising the steps of marking the component with at least one machine readable marker and at least one visual marker wherein at least one marker is physically removable and at least one marker is not.

For wires, the at least one marker is incorporated in a sheath covering the component.

Using visual code associated with the location (e.g. address, zip code, government, business, residential, or some combination) allows for the origin of units to be more readily determined based on broad designators, for example every marker in Alabama starts with red.

An epoxy strip may be used. A permanent strip which is breathable or sufficiently thin may be permanently applied (e.g. spiraled over the surface) in lieu of removable tape. Likewise the bar coding may be continuous.

In this example, MR marking (and when used herein, "MR marking" refers to any type of coding technology) is placed on copper, for example by using a marking agent so that the MR marking and or visual marking is actually drawn as with H2SO4. In this way, the tape can be peeled off of the carrying strip with the bar code on it, placed on the copper and left for a period of time for the H2SO4 treatment to encode the copper and then the tape may be peeled away in this example and a fixing or neutralizing agent may be applied. An automatically released neutralizing agent may be used, for example one which begins after the tape is removed. A length of the strip may be wrapped around a length of the stripe and then peeled off leaving a permanent mark showing that the entire thing has been marked or it may be applied as a strip on top of the pipe, potentially wrapped over it and the marking may in some cases, be applied by using a strap which is permanently attached since that would serve to provide a MR marking and if the MR marking is removed, the stain remaining indicates a coded marked item (component 1).

A critical element of the invention which is the marking of the exterior or support with MR coding and visual coding which serves two purposes. The first is in order to discourage theft. The second purpose is to allow someone inspecting the unit from the exterior to check to make sure that the unit is not a stolen unit and in order to prevent multiple charges associated with marking a single unit, which might otherwise occur.

Because many varying and different embodiments may be made within, the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A method of marking components which are installed at a location comprising the steps of 1) preparing at least one tape means for attaching to the component with markings from the group comprising visual and machine readable markings; 2) applying the at least one tape means to the components, 3) fixing the markings to the component so that removal of the markings is indicated and wherein the tape means is a sheath means for covering the component said sheath means bearing markings from the group comprising visual and machine readable markings; 2) applying the at least sheath over the components, 3) fixing the sheath to the component so that removal of sheath is indicated.

2. The method of claim 1 further comprising the steps of including at least one machine readable marking on the tape means and reading the machine readable marking with a machine, loading the marking information onto a computer database and associating the code with location information related to component.

3. The method of claim 2 wherein the step of including at least one machine readable marking further comprises the step of defining a plurality of different machine readable markings for marking of a plurality of components.

4. The method of claim 1 further comprising the step of including at least one visual marking for marking the component as having a machine readable marking and wherein the component fits within a housing and further comprising the step of marking the housing with the at least one visual marking to show the component is marked according to the method.

5. The method of claim 1 wherein the housing comprises a post means for supporting the housing, said post having a portion at eye level and wherein the step of marking further comprises marking the post means at eye level.

6. The method and product of claim 1 wherein the marking system comprises a chemical marker not commonly found on the component showing that the component has been associated with a machine readable marking.

7. The method of claim 1 further comprising a machine readable marking issuing a RF transmission and a MR reader for reading the transmission and a perimeter within which the RF transmission is readable by the MR reader so that if the machine readable marking is moved outside of the perimeter the movement is sensed and comprising the step of issuing an alarm when the marker is moved outside of the perimeter.

8. The invention of claim 1 wherein the tape means comprises a chemical for altering the component to include the marking into the component.

9. The invention of claim 8 wherein the component is copper and the chemical is an acid defining the marking.

10. The invention of claim 9 wherein the marking comprises a template defining openings for receiving chemical.

11. The invention of claim 1 wherein the marking comprises a template defining openings and further comprising the step of buffing the markings through the openings in the tape means.

12. The method of claim 1 wherein at least one tape means is tamper evident tape.

13. The method of claim 1 wherein the at least one tape means comprises a plurality of tapes each having at least one marking and wherein those markings are sequential to the markings of the other other tapes.

14. The method of claim 1 wherein the component has a length and wherein the markings are comprised of a sequential series of markings along the length.

15. The method of claim 1 wherein the component has a length and wherein the markings are comprised of a sequential series of markings along the length.

16. A method of marking components which are installed at a location comprising the steps of 1) preparing at least one tape with markings from the group comprising visual and machine readable markings; 2) applying the at least one tape to the components, 3) fixing the markings to the component so that removal of the markings is indicated and further comprising the step of including at least one visual marking for marking the component as having a machine readable marking and wherein the component has a length and wherein the markings are comprised of a sequential series of markings along the length.

17. A method of marking components with a length installable at an address comprising the steps of establishing a set of sequential machine readable (MR) markings along the length, installing a portion of the component at a given location so that a least a first machine readable marking is at the beginning of the installed component and at least a second machine readable marking is at the end of the installed component; recording in a database the first and second MR marking; associating the first and second MR marking and any interim MR markings in the sequential series with the address.

18. The method of marking components of claim 17 comprising the steps of marking the components with at least one machine readable marker and at least one visual marker wherein at least one marker is physically removable and at least one marker is not.

19. The method of claim 17 comprising having the visual code associated with the location.

* * * * *